United States Patent
Tamura

(10) Patent No.: US 7,929,855 B2
(45) Date of Patent: Apr. 19, 2011

(54) IMAGE TAKING SYSTEM, METHOD OF CONTROLLING THE SAME AND RECORDING MEDIUM

(75) Inventor: Kazunori Tamura, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 196 days.

(21) Appl. No.: 12/266,911

(22) Filed: Nov. 7, 2008

(65) Prior Publication Data

US 2009/0123143 A1    May 14, 2009

(30) Foreign Application Priority Data

Nov. 8, 2007 (JP) ................................. 2007-290578
Jan. 16, 2008 (JP) ................................. 2008-006367

(51) Int. Cl.
*G03B 17/18* (2006.01)
(52) U.S. Cl. ............................. 396/203; 362/5; 348/371
(58) Field of Classification Search .................. 396/155, 396/159, 163, 164, 201–203; 313/110, 524; 315/291, 307; 348/370, 371; 362/5; 399/37
See application file for complete search history.

(56) References Cited

U.S. PATENT DOCUMENTS

| 4,210,849 A | * | 7/1980 | Naya et al. | ..................... 396/159 |
| 5,264,883 A | * | 11/1993 | Kazami et al. | ................ 396/202 |
| 6,348,798 B1 | * | 2/2002 | Daw | ............................. 324/426 |
| 6,636,263 B2 | | 10/2003 | Oda | |

FOREIGN PATENT DOCUMENTS

JP    2003186098 A   *   7/2003

\* cited by examiner

*Primary Examiner* — Clayton E LaBalle
*Assistant Examiner* — Autumn Parker
(74) *Attorney, Agent, or Firm* — Sughrue Mion, PLLC

(57) ABSTRACT

An image taking system includes an image taking circuit which photographs the object upon receipt of a photographing instruction and obtains an image representing the object, a light emitting circuit which emits stroboscopic light, a photographing control circuit which controls the image taking circuit to execute a continuous photographing where a plurality of images are continuously taken including a plurality of images with following stroboscopic light, a stroboscopic light control circuit which controls the light emitting circuit to emit the stroboscopic light when photographing the images with following stroboscopic light, and an estimating circuit which estimates, when photographing the images with following stroboscopic light, the remaining energy in the charging unit after the photographing, on the basis of each light emission and the remaining energy in the charging unit upon the light emission.

12 Claims, 12 Drawing Sheets

FIG.3

CONTINUOUS PHOTOGRAPHING SETTING — 40

| NUMBER OF PHOTOGRAPHINGS | 4 |
|---|---|
| FRAME 1 | |
| FRAME 2 | |
| FRAME 3 | |
| FRAME 4 | |

— 41

42 —

| ISO SENSITIVITY | 400 |
| STROBOSCOPIC LIGHT | FORCED LIGHT EMISSION |
| EXPOSURE CORRECTION | ±0 |
| WB | AUTO |
| DIAPHRAGM VALUE | AUTO |
| SHUTTER SPEED | AUTO |

— 43

| 1 | 1 | 1 | 1 | 1 | 1 | 1 | 1 |
|---|---|---|---|---|---|---|---|
| 1 | 2 | 2 | 2 | 2 | 2 | 2 | 1 |
| 1 | 2 | 5 | 5 | 5 | 5 | 2 | 1 |
| 1 | 2 | 5 | 10 | 10 | 5 | 2 | 1 |
| 1 | 2 | 5 | 10 | 10 | 5 | 2 | 1 |
| 1 | 2 | 5 | 5 | 5 | 5 | 2 | 1 |
| 1 | 2 | 2 | 2 | 2 | 2 | 2 | 1 |
| 1 | 1 | 1 | 1 | 1 | 1 | 1 | 1 |

START
↓ ST31
TEMPORARY TIME INTERVALS FOR LIGHT EMISSION Tk1m AND Tk2m CALCULATED
↓ ST32
TIME INTERVAL FOR LIGHT EMISSION Tm CALCULATED
↓ ST33
TEMPORARY REMAINING VOLTAGES Vk1m AND Vk2m CALCULATED
↓ ST34
REMAINING VOLTAGE Vm+1 CALCULATED
↓
END

| | LUT1 | LUT2 |
|---|---|---|
| AMOUNT OF LIGHT EMISSION | AMOUNT OF LIGHT EMISSION FOR Vr1 ($\mu s$) | AMOUNT OF LIGHT EMISSION FOR Vr2 ($\mu s$) |
| 2.0 | 48.5 | 77.0 |
| 1.0 | 30.5 | 49.0 |
| 0.0 | 21.2 | 34.0 |
| −1.0 | 15.5 | 24.5 |
| −2.0 | 11.6 | 18.0 |

FIG.10

| Evsm | | Tk1m | Tm | Tk2m |
|---|---|---|---|---|
| 2.0 | | 48.5 | | 77.0 |
| 1.0 | | 30.5 | | 49.0 |
| 0.0 | | 21.2 | | 34.0 |
| -1.0 | | 15.5 | | 24.5 |
| -2.0 | | 11.6 | | 18.0 |

FIG.11

| | LUT3 | LUT4 |
|---|---|---|
| AMOUNT OF LIGHT EMISSION | REMAINING VOLTAGE FOR Vr1($\mu$s) | REMAINING VOLTAGE FOR Vr2($\mu$s) |
| 2.0 | 249 | 202 |
| 1.0 | 260 | 215 |
| 0.0 | 267 | 222 |
| -1.0 | 271 | 227 |
| -2.0 | 274 | 230 |

FIG.12

| Evsm | | Vk1m | Vm+1 | Vk2m |
|---|---|---|---|---|
| 2.0 | | 249 | | 202 |
| 1.0 | | 260 | | 215 |
| 0.0 | | 267 | | 222 |
| -1.0 | | 271 | | 227 |
| -2.0 | | 274 | | 230 |

REMAINING VOLTAGE AFTER CHARGE

|  | FIRST FRAME | SECOND FRAME | THIRD FRAME |
| --- | --- | --- | --- |
| ISO SENSITIVITY | 200 | 400 | 400 |
| DIAPHRAGM VALUE | 2.8 | 2.8 | 2.8 |
| SHUTTER SPEED | 1/60 | 1/60 | 1/15 |
| REMAINING VOLTAGE | 260 | 220 | 190 |
| AMOUNT OF LIGHT EMISSION | 2EV | 1EV | 0.5EV |
| TIME INTERVAL FOR LIGHT EMISSION | 100usec | 80usec | 70usec |

IMAGE TAKING SYSTEM, METHOD OF CONTROLLING THE SAME AND RECORDING MEDIUM

BACKGROUND OF THE INVENTION

1. Field of the Invention

This invention relates to an image taking system such as a digital camera which is capable of continuously taking images, a method of controlling the same and a computer-readable recording medium on which a program for causing a computer to execute the method of controlling the image taking system is recorded.

2. Description of the Related Art

There has been proposed a technique where two images are obtained prior to photographing both by the use of exposure without following stroboscopic light and by the use of exposure with following stroboscopic light and the amount of stroboscopic light to be emitted from the stroboscopic light source during photographing is controlled (or regulated) by the use of the two images. Such a technique where the amount of stroboscopic light to be emitted from the stroboscopic light source during photographing is calculated by the use of exposure without stroboscopic light and by the use of exposure with regulated stroboscopic light is generally referred to as the "light regulation calculation". By exposing to light on the basis of the light regulation calculation, an image having a suitable brightness can be obtained.

When a continuous photographing is to be executed in a digital camera, exposures such as the ISO sensitivity, the stop, the shutter speed, whether the stroboscopic light is to be energized and the like are sometimes set for each photographing to different defaults. A plurality of times continuous emission of the stroboscopic light is sometimes required at the same time. When a continuous stroboscopic photographing is to be executed, it is required to charge the main capacitor each time the stroboscopic light is emitted. Accordingly, there is a problem that the continuous photographing with following stroboscopic light is reduced in the number of frames to be exposed in a unit time as compared with the continuous photographing without following stroboscopic light. Further, there is a fear that the amount of stroboscopic light to be emitted from the stroboscopic light source during later photographing can become short after a plurality of times continuous emission of the stroboscopic light.

For this reason, there is proposed a method in U.S. Pat. No. 6,636,263 where the amount of stroboscopic light to be emitted from the stroboscopic light source during continuous photographing and the amount of charge of the main capacitor required to realize the amount of stroboscopic light are estimated and when the time interval required to get the amount of charge of the main capacitor is longer than the time interval between the frames during the continuous photographing, the gain upon photographing is increased in order to compensate for the shortage of the amount of stroboscopic light.

When the technique disclosed in U.S. Pat. No. 6,636,263 is employed, the image quality is deteriorated since noise is increased as the gain is increased when the amount of stroboscopic light to be emitted from the stroboscopic light source becomes short. For this reason, it is conceivable that the stroboscopic light is continuously emitted without charging the main capacitor during a continuous photographing with following stroboscopic light and a remaining voltage in the main capacitor is measured each time the stroboscopic light is emitted, whereby the amount of stroboscopic light to be emitted from the stroboscopic light source is ensured by elongating the time interval between the frames.

However, the unit for measuring the remaining voltage in the main capacitor adds to the cost and complicates the circuitry to make the camera larger.

SUMMARY OF THE INVENTION

In view of the foregoing observation and description, the primary object of the present invention is to provide an image taking system which can calculate a suitable light emitting time without measuring the energy in the charging unit such as the main capacitor when light is to be emitted a plurality of times.

Further, the secondary object of the present invention is to provide an image taking system which can emit a suitable light without measuring the energy in the charging unit such as the main capacitor when light is to be emitted a plurality of times.

In accordance with the present invention, there is provided a first image taking system comprising an image taking unit which photographs the object upon receipt of a photographing instruction and obtains an image representing the object, a light emitting unit which emits stroboscopic light, a charging unit which stores energy for emitting the stroboscopic light, a photographing control unit which controls the image taking unit to execute a continuous photographing where a plurality of images are continuously taken including a plurality of images with following stroboscopic light, a stroboscopic light control unit which controls the light emitting unit to emit the stroboscopic light when photographing the images with following stroboscopic light, and an estimating unit which estimates, when photographing the images with following stroboscopic light, the remaining energy in the charging unit after the photographing, on the basis of each light emission and the remaining energy in the charging unit upon the light emission.

In the first image taking system of the present invention, the estimating unit may estimate the remaining energy in the charging unit after the photographing with reference to a first table where the remaining energy in the charging unit after the photographing is determined on the basis of the relation to various light emissions and predetermined first remaining energy and a second table where the remaining energy in the charging unit after the photographing is determined on the basis of the relation to various light emissions and predetermined second remaining energy different from the first remaining energy.

Further, in the first image taking system of the present invention, the photographing control unit may be a unit for executing the photographing where the light emission is maximized in photographing the plurality of images last of the plurality of images which are to be continuously taken with following stroboscopic light.

Though preferred to be executed in the order of decreasing the light emission, the photographings to be executed before the last may be executed at random or in a predetermined order.

Further, in the first image taking system of the present invention, the stroboscopic light control unit may suppress, when there is a photographing where the estimated remaining energy in the charging unit is smaller than a predetermined value, the amount of the stroboscopic light emission in the photographings to be executed at least before the estimated remaining energy in the charging unit is smaller than a predetermined value.

The expression "the photographings to be executed at least before the estimated remaining energy in the charging unit is smaller than a predetermined value" may include at least one preceding photographing to be executed before the estimated remaining energy in the charging unit is smaller than a predetermined value and may include all the photographings to be executed before the photographing including the same. Especially, when the photographing is the last one in the photographings, the expression "the photographings to be executed at least before the estimated remaining energy in the charging unit is smaller than a predetermined value" may include all the photographings other than the last one.

Further, in the first image taking system of the present invention, when there is a photographing where the estimated remaining energy in the charging unit is smaller than a predetermined value, the photographing control unit may be a unit for executing at least the photographing where the estimated remaining energy in the charging unit is smaller than a predetermined value last of the plurality of images which are to be continuously taken with following stroboscopic light.

Though preferred to be executed in the order of decreasing the light emission, the photographings to be executed before the last may be executed at random or in a predetermined order.

Further, the first image taking system of the present invention may further comprise an alarm unit which makes an alarm when there is a photographing where the estimated remaining energy in the charging unit is smaller than a predetermined value.

Further, in the first image taking system of the present invention, the stroboscopic light control unit may be a unit for calculating the amount of light emission when the plurality of images are taken.

Further, the first image taking system of the present invention may further comprise an information attaching unit for attaching continuous photographing information including information on the amount of light emission and the remaining energy in the charging unit to the image obtained through the photographing.

Further, in the first image taking system of the present invention, the stroboscopic light control unit may be a unit for calculating the next time interval of light emission on the basis of the remaining energy.

Further, in the first image taking system of the present invention, the estimating unit and the stroboscopic light control unit may be unit for executing the estimation of the remaining energy and calculation of the next time interval of light emission at least at a time after the calculation of the light emission.

The expression "at least at a time" includes not only the case where the estimation of the remaining energy and calculation of the next time interval of light emission are executed together but also the case where the calculation of the next time interval of light emission is executed after other processes after the estimation of the remaining energy.

Further, the first image taking system of the present invention may further comprise an information attaching unit for attaching continuous photographing information including information on the amount of light emission, the remaining energy in the charging unit and the time interval of light emission to the image obtained through the photographing.

In accordance with the present invention, there is further provided a light emitting system comprising a light source which emits light, a power source which stores energy for emitting the light from the light source, and an estimating unit which estimates, when the light emission is executed a plurality of times, the remaining energy after the light emissions on the basis of each light emission and the remaining energy upon the light emission.

In the light emitting system of the present invention, the estimating unit may estimate the remaining energy after the light emissions with reference to a first table where the remaining energy after the light emissions is determined on the basis of the relation to various light emissions and predetermined first remaining energy and a second table where the remaining energy after the light emissions is determined on the basis of the relation to various light emissions and predetermined second remaining energy different from the first remaining energy.

Further, the light emitting system of the present invention may further comprise a light emission control unit for calculating the next time interval of light emission on the basis of the remaining energy.

In accordance with the present invention, there is further provided a method of controlling the first image taking system comprising an image taking unit which photographs the object upon receipt of a photographing instruction and obtains an image representing the object, a light emitting unit which emits stroboscopic light, a charging unit which stores energy for emitting the stroboscopic light, a photographing control unit which controls the image taking unit to execute a continuous photographing where a plurality of images are continuously taken including a plurality of images with following stroboscopic light, and a stroboscopic light control unit which controls the light emitting unit to emit the stroboscopic light when photographing the images with following stroboscopic light, comprising the steps of estimating, when photographing the images with following stroboscopic light, the remaining energy in the charging unit after the photographing, on the basis of each light emission and the remaining energy in the charging unit upon the light emission.

In accordance with the first image taking system and the method of controlling the same of the present invention, when the stroboscopic light is emitted a plurality of times, the remaining energy in the charging unit after the photographing is estimated on the basis of each light emission and the remaining energy in the charging unit upon the light emission. Accordingly, the time interval of light emission can be calculated on the basis of the estimated remaining energy in the charging unit without adding a unit for measuring the remaining energy in the charging unit to the system. Accordingly, the time interval of light emission when photographing the images with following stroboscopic light can be calculated with less cost without complicating the hard structure of the image taking system.

Further, by estimating the remaining energy after the light emissions with reference to a first table where the remaining energy after the light emissions is determined on the basis of the relation to various light emissions and predetermined first remaining energy and a second table where the remaining energy after the light emissions is determined on the basis of the relation to various light emissions and predetermined second remaining energy different from the first remaining energy, the remaining energy after each of the light emissions can be estimated by easy calculations.

Since, as the amount of stroboscopic light emission increases, the remaining energy in the charging unit can be reduced, executing the photographing where the light emission is maximized in photographing the plurality of images at the beginning of the plurality of images which are to be continuously taken with following stroboscopic light will involve shortage of the energy required to the light emission upon the later photographings. Accordingly, by executing the photographing where the light emission is maximized in photographing the plurality of images last of the plurality of images which are to be continuously taken with following stroboscopic light, there is a less possibility that the energy required to the light emission upon the later photographings becomes short.

When the remaining energy in the charging unit is too small, it is sometimes impossible to emit the stroboscopic light. Accordingly, by suppressing the amount of the stroboscopic light emission in the photographings to be executed at least before the estimated remaining energy in the charging unit is smaller than a predetermined value when there is a photographing where the estimated remaining energy in the charging unit is smaller than a predetermined value, the stroboscopic light can be surely emitted in the plurality of photographings since there is no case where the remaining energy in the charging unit is smaller than the predetermined value.

By executing at least the photographing where the remaining energy in the charging unit is smaller than the predetermined value in this case, the stroboscopic light can be surely emitted in all the photographings with following stroboscopic light.

When there is a photographing where the estimated remaining energy in the charging unit is smaller than a predetermined value, by making alarm before the photographing is started, the photographer can be told that there is a possibility that the energy required to the light emission upon the photographings becomes short.

By attaching continuous photographing information including information on the amount of light emission, the remaining energy in the charging unit and the time interval of light emission to the image obtained through the photographing, the state of the stroboscopic light can be known by the use of the continuous photographing information. Accordingly, processing can be carried out according to the state of the stroboscopic light.

When the estimation of the remaining energy in the charging unit and the calculation of the next time interval of light emission are executed together at a time after the calculation of the light emission, a time series movement of the estimated remaining energy in the charging unit is suppressed and the processing can be done with ease. On the other hand, when the estimation of the remaining energy in the charging unit and the calculation of the next time interval of light emission are separately executed in a plurality of times after the calculation of the light emission, it is not necessary to execute the estimation of the remaining energy in the charging unit and the calculation of the next time interval of light emission for all the photographing in the time between the calculation of the next time interval of light emission and the next photographing, the estimation of the remaining energy in the charging unit and the calculation of the next time interval of light emission can be smoothly executed.

In accordance with the present invention, there is further provided a second image taking system comprising an image taking unit which photographs the object upon receipt of a photographing instruction and obtains an image representing the object, a light emitting unit which emits stroboscopic light, a charging unit which stores energy for emitting the stroboscopic light, a photographing control unit which controls the image taking unit to execute a continuous photographing where a plurality of images are continuously taken including a plurality of images with following stroboscopic light, a stroboscopic light control unit which controls the light emitting unit to emit the stroboscopic light when photographing the images with following stroboscopic light, and an estimating unit which estimates, when photographing the images with following stroboscopic light, the remaining energy in the charging unit after the photographing, on the basis of each light emission and the remaining energy in the charging unit upon the light emission, wherein the stroboscopic light control unit sets, when there is a light emission where the estimated remaining energy in the charging unit is smaller than a predetermined value, the light emission to the light emission where an electric charge is necessary.

In the second image taking system of the present invention, the stroboscopic light control unit may be a unit for electrically charging the charging unit after the light emission where the estimated remaining energy in the charging unit is smaller than a predetermined value.

Further, in the second image taking system of the present invention, the estimating unit may be a unit for estimating the remaining energy in the charging unit after charging on the basis of the relation of the charging times and the remaining energy in the charging unit predetermined for the charging unit after charging for the light emission where the charging is to be executed.

Further, in the second image taking system of the present invention, the stroboscopic light control unit may be a unit for calculating the next time interval of light emission on the basis of the remaining energy.

In accordance with the present invention, there is further provided a method of controlling the second image taking system comprising an image taking unit which photographs the object upon receipt of a photographing instruction and obtains an image representing the object, a light emitting unit which emits stroboscopic light, a charging unit which stores energy for emitting the stroboscopic light, a photographing control unit which controls the image taking unit to execute a continuous photographing where a plurality of images are continuously taken including a plurality of images with following stroboscopic light, and a stroboscopic light control unit which controls the light emitting unit to emit the stroboscopic light when photographing the images with following stroboscopic light, comprising the steps of when emitting the stroboscopic light in a plurality of times, the remaining energy in the charging unit after the photographing is estimated on the basis of each light emission and the remaining energy in the charging unit upon the light emission, and when there is a light emission where the estimated remaining energy in the charging unit is smaller than a predetermined value, the light emission is set to the light emission where an electric charge is necessary.

In accordance with the present invention, there is further provided a third taking system comprising an image taking unit which photographs the object upon receipt of a photographing instruction and obtains an image representing the object, a light emitting unit which emits stroboscopic light, a charging unit which stores energy for emitting the stroboscopic light, a photographing control unit which controls the image taking unit to execute a continuous photographing where a plurality of images are continuously taken including a plurality of images with following stroboscopic light, a stroboscopic light control unit which controls the light emitting unit to emit the stroboscopic light when photographing the images with following stroboscopic light while charging the charging unit between emissions of the stroboscopic light when necessary, and an estimating unit which estimates the remaining energy in the charging unit after the charging after each light emission on the basis of the remaining energy in the charging unit after each light emission and the relation of the charging time and the remaining energy in the charging unit predetermined for the charging unit.

The expression "when necessary" includes, for instance, not only the case where the necessary energy becomes short and the charging unit is electrically charged but also the cases where the charging unit is electrically charged between all the emissions of the stroboscopic light.

In accordance with the present invention, there is further provided a method of controlling the image taking system comprising an image taking unit which photographs the object upon receipt of a photographing instruction and obtains an image representing the object, a light emitting unit which emits stroboscopic light, a charging unit which stores energy for emitting the stroboscopic light, and a photographing control unit which controls the image taking unit to execute a continuous photographing where a plurality of images are continuously taken including a plurality of images with following stroboscopic light, comprising the step of when controlling the light emitting unit to emit the stroboscopic light when photographing the images with following stroboscopic light while charging the charging unit between emissions of the stroboscopic light when necessary, estimating remaining energy in the charging unit after the charging after each light emission on the basis of the remaining energy in the charging unit after each light emission and the relation of the charging time and the remaining energy in the charging unit predetermined for the charging unit.

A computer-readable recording medium on which a program for causing a computer to execute one of the methods of controlling the first to third image taking systems is recorded may be provided.

A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission unit is also within the scope of this invention. Additionally, computer code/instructions include, but are not limited to, source, object and executable code and can be in any language including higher level languages, assembly language and machine language.

In accordance with the second image taking system of the present invention and the method of controlling the same, when emitting the stroboscopic light in a plurality of times, the remaining energy in the charging unit after each light emission is estimated on the basis of each light emission and the remaining energy in the charging unit upon the light emission, and when there is a light emission where the estimated remaining energy in the charging unit is smaller than a predetermined value, the light emission is set to the light emission where an electric charge is necessary. Accordingly, the time interval of light emission can be calculated on the basis of the estimated remaining energy in the charging unit without adding a unit for measuring the remaining energy in the charging unit to the system. Accordingly, the time interval of light emission when photographing the images with following stroboscopic light can be calculated with less cost without complicating the hard structure of the image taking system. Further, even when emitting the stroboscopic light in a plurality of times, the stroboscopic light can be surely emitted in each time.

By estimating the remaining energy in the charging unit, for the light emission where the charging unit is charged, after the charging on the basis of the relation of the charging time and the remaining energy in the charging unit predetermined for the charging unit, even in the case where the charging unit is charged, the time interval of light emission can be calculated on the basis of the estimated remaining energy in the charging unit.

In accordance with the third image taking system of the present invention and the method of controlling the same, when emitting the stroboscopic light in a plurality of times with charging the charging unit when necessary, the remaining energy in the charging unit after the charging is estimated on the basis of the remaining energy in the charging unit after each light emission and the relation of the charging time and the remaining energy in the charging unit predetermined for the charging unit. Accordingly, when the charging is to be executed, the time of light emission can be calculated on the basis of the estimated remaining energy in the charging unit before charging.

BRIEF DESCRIPTION OF THE DRAWINGS

FIG. 3 is a view showing the screen for setting the continuous photographing,

FIG. 10 is a view for describing calculation of light emission time interval, FIG. 11 is a view showing a table where various amounts of light emission are linked with a remaining voltage, FIG. 12 is a view for describing calculation of the remaining voltage.

DESCRIPTION OF THE PREFERRED EMBODIMENT

A digital camera which is an embodiment of the present invention and a method of controlling the same will be described by way of example, hereinbelow.

Figure 1:
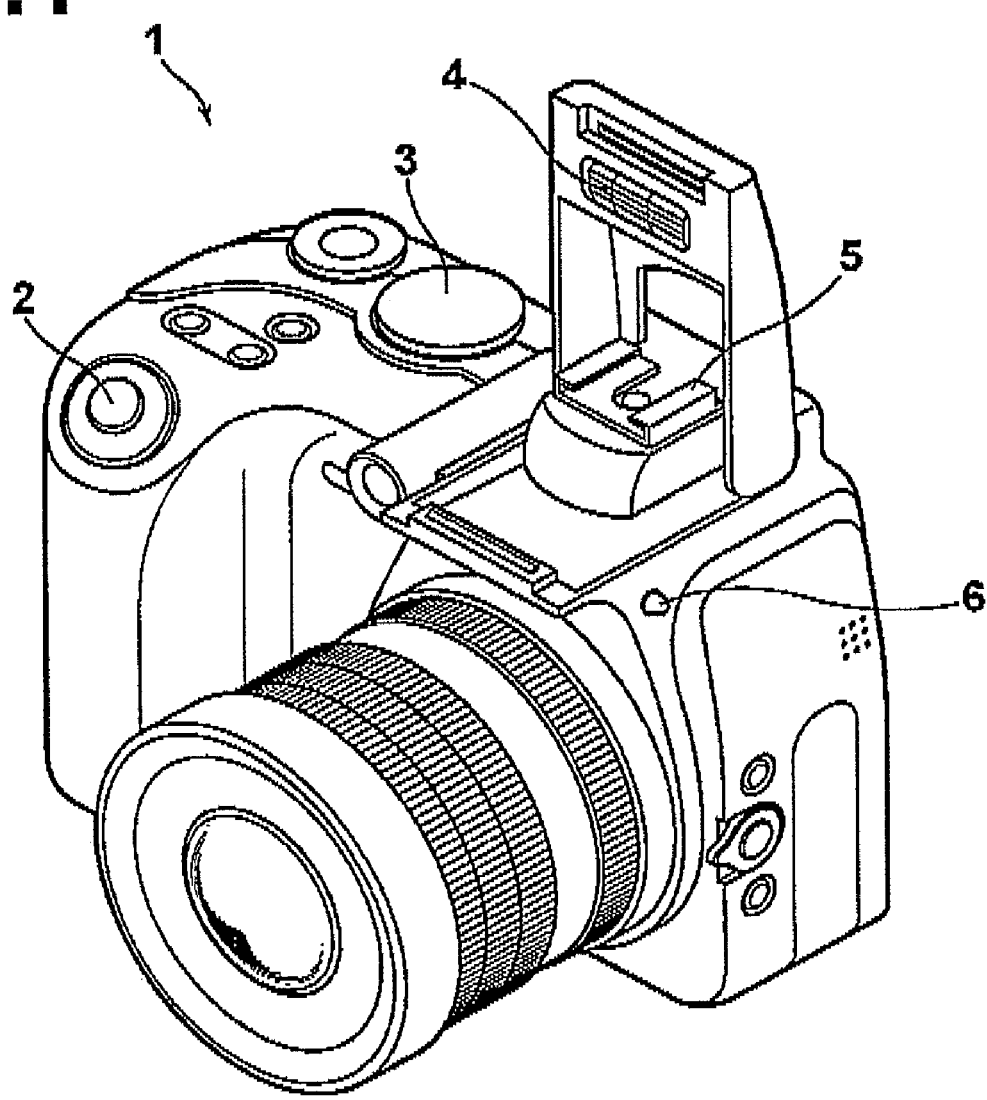
FIG. 1 is a brief outside view of a digital camera.

FIG. 1 is a brief outside view of a digital camera in accordance with a first embodiment of the present invention. As shown in FIG. 1, a digital camera 1 which is a first embodiment of the present invention comprises a shutter release button 2, a mode dial 3 which is used in setting the photographing mode, a stroboscopic lamp 4 and a hot shoe 5 on which the accessories are mounted.

The shutter release button 2 is of such a structure that is able to instruct a pair of kinds of actions by depression in two stages. For example, in the photographings by the use of auto exposure (AE) and auto focus (AF), the digital camera 1 prepares for the photographing by adjustment of the exposure and the focus by AE processing and AF processing in response to the first depression (semi-depression) where the shutter release button 2 is depressed light. When the second depression (full-depression) where the shutter release button 2 is depressed strong is done in the state, the digital camera 1 starts exposure and records image data for the frame obtained through the exposure.

The stroboscopic lamp 4 comprises, for instance, a xenon lamp and opens at the upper surface of the camera body as shown in FIG. 1 in response to depression of a stroboscopic lamp pop-up button 6 provided by the camera body. Depending on the photographing mode, the stroboscopic lamp 4 is automatically popped up.

The popped up stroboscopic lamp 4 emits light twice in synchronization with the second depression of the shutter release button 2 when only one image is to be taken at one time. The first light emission is a "pre-light emission" for measuring amount of light reflected by the object and in the first light emission, a very small amount of light is emitted as compared with the normal light emission. The pre-light emission has a purpose of preventing the red eye in addition to the measurement of the reflected light. The second-light emission is a "running-light emission" for supplying sufficient light to the object and if the amount of light emitted by the running-light emission is suitable, an image of the suitable brightness can be obtained.

When a continuous photographing is to be effected by the use of the stroboscopic lamp 4, the stroboscopic lamp 4 emits light in necessary times after the pre-light emission in synchronization with when the shutter release button 2 is depressed in the second stage.

Figure 2:
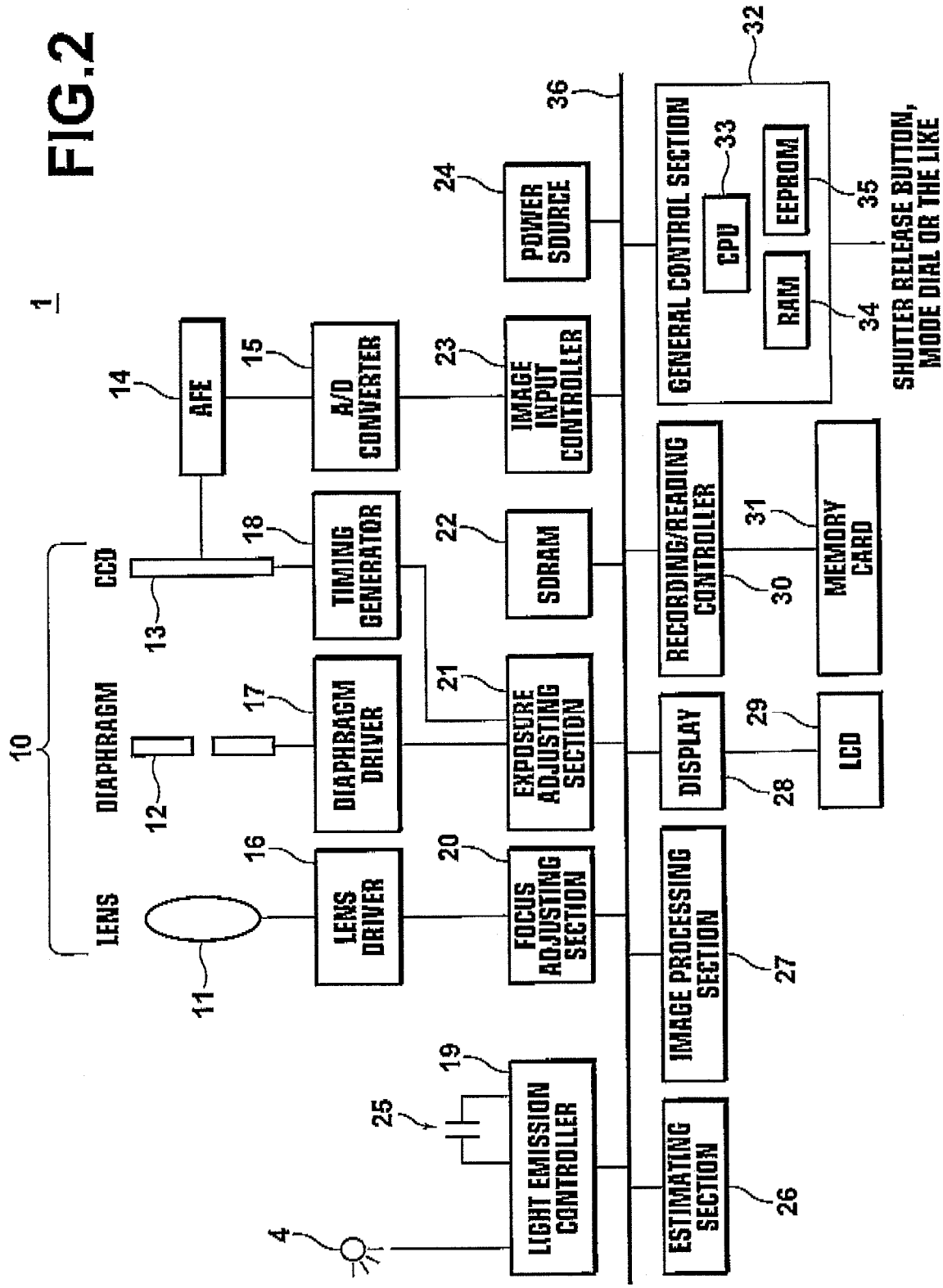
FIG. 2 is a view showing the internal components of the digital camera.

The inner structure of the digital camera 1 will be described with reference to FIG. 2, hereinbelow. The digital camera 1 is provided with an image taking section 10 comprising a lens system 11, a lens driver 16, a diaphragm 12, a diaphragm driver 17, a CCD 13 and a timing generator (TG) 18.

The lens system 11 comprises a plurality of functional lenses such as a focusing lens for adjusting the focus on the object, a zoom lens for realizing the zooming function, and the like. The lens driver 16 comprises a small-size motor such as a stepping motor to adjust a distance of the functional lens from the CCD 13 to be suitable for the purpose.

The diaphragm 12 comprises a plurality of feathers. The diaphragm driver 17 comprises a small-size motor such as a stepping motor to adjust a size of the diaphragm aperture to be suitable for the purpose.

The CCD 13 comprises 500 to 1200 billions of primary color filters, and releases the stored charges in response to a signal from the timing generator 18. The timing generator 18 sends a signal to the CCD 13 to store the charges for a desired times, thereby adjusting the shutter speed.

Further, the digital camera 1 comprises an AFE (analogue front end) 14 which carries out on the output signals from the CCD 13 processing of removing noise and processing of adjusting the gain (to be referred to as "the analogue processing", hereinbelow), an A/D converter 15 which digitizes the output signal analogue-processed by the AFE 14, an image input controller 23 which transfers the image data output from the A/D converter 15 to other processing sections and a SDRAM 22 which temporarily stores the image data transferred from the image input controller 23. The image data to be stored in the SDRAM 22 is RAW data. The gain of the AFE 14 is determined to the ISO sensitivity set by the AE processing or the like.

Further, the digital camera 1 is further provided with the stroboscopic lamp 4, a light emission controller 19 which controls the light emission timing and the amount of light emission of the stroboscopic lamp 4, a focus adjusting section 20 which adjusts the focus by instructing a movement of the lens 11 to the lens driver 16, an exposure adjusting section 21 which determines the ISO sensitivity, value of the diaphragm and the shutter speed and sends instruction signals to the AFE 14, diaphragm driver 17 and the timing generator 18 and a power source 24 which is a power source of each part of the digital camera 1.

The light emission controller 19 is connected to for charging the electric charges (energy) necessary for light emission of the stroboscopic lamp 4. Further, the light emission controller 19 sets the amount of light emission for each of the photographings by the light regulating processing to be described later in the continuous photographing with following stroboscopic light to be described later.

Further, the digital camera 1 is further provided with an estimating section 26 which estimates a remaining energy (remaining voltage) in the main capacitor 25 when a continuous photographing with following stroboscopic light. Further, the light emission controller 19 calculates the time of light emission of the stroboscopic lamp 4 on the basis of the remaining voltage estimated by the estimating section 26. The light regulating processing, the estimation of the remaining voltage and calculation of the time of light emission of the stroboscopic lamp 4 will be described later.

Further, the digital camera 1 is additionally provided with an image processing section 27 which ca out the image processing on the image data stored in the SDRAM 22. The image processing section 27 again stores, after executing processing on various finishes for improving the appearance of the image such as the color gradation correction for rendering the image of a natural color and brightness, brightness correction, white balance adjustment, processing for turning a red eye to a black eye (when the image data includes a red eye) and the like, the processed image data in the SDRAM 22.

Further, the digital camera 1 is provided with a display control section 28 which controls the output of the image data in the SDRAM 22 to a liquid crystal display 29. The display control section 28 thins the pixel of the image data in the SDRAM 22 to the number of pixels suitable for the display and outputs the image data to the liquid crystal display 29.

Further, the digital camera 1 is provided with a recording/reading control section 30 which controls writing the image data in the SDRAM 22 to the memory card 31, and load of the image data in the memory card 31 to the SDRAM 22. The recording/reading control section 30 records the RAW data to the memory card 31 as it is or after converting the same to the JPEG data according to the setting of the user. When loading the JPEG data, it loads the data in the SDRAM 22 after carrying out the conversion reverse thereto.

Further, the digital camera 1 is additionally provided with a general control section 32 comprising a CPU (central processor unit) 33, a RAM (random access memory) 34 in which control/control program is stored, and an EEPROM (electrically erasable and programmable read only memory) 35 in which various defaults are stored. The general control section 32 detects all the setting of the user as well as the setting of the photographing mode by the mode dial and causing the EEPROM 35 to store the contents of the same. When the setting control or the photographing control is executed, the general control section 32 sends a signal for instructing the processing to be executed and the timing of the processing to the light emission control section 19, focus adjusting section 20, exposure adjusting section 21, image input controller 23, estimating section 26, image processing section 27, display control section 28 and the recording/reading control section 30 described before by way of the system bus 36 according to the setting values stored in the EEPROM 35. Further, a table where a relation between the amount of light emission and the remaining voltage is determined and a table where a relation between the amount of light emission and the time of light emission is determined which are to be described later are stored in the EEPROM 35.

Further, in the first embodiment, the photographer sets in advance the continuous photographing mode before the photographing. FIG. 3 is a view showing the screen for setting the continuous photographing displayed on the liquid crystal display 29. As shown in FIG. 3, in the continuous photographing setting screen 40, a command 41 for setting the number of frames to be photographed in the continuous photographing, a command 42 for setting the exposure of the frames to be photographed in the continuous photographing (ISO sensitivity, use of the stroboscopic lamp 4, exposure correction, white balance (WB), diaphragm value, and shutter speed) and a command 43 for setting the diaphragm value and the shutter speed are displayed. Though not being a factor which has influences on the exposure, the white balance is included, here, in the command 42 for setting the exposure of the frames to be photographed for the purpose of simplicity.

As the stroboscopic lamp 4, light emission inhibition, forced light emission, and slow synchronization and the like can be set. As the exposure correction, values ±0, ±0.5, ±1 and the like can be set. As the ISO sensitivity, white balance, diaphragm value, and the shutter speed, "Auto" can be set as well as the desired value desired by the photographer. The "Auto" unit that the ISO sensitivity, diaphragm value, and the shutter speed as calculated by the AE processing are used as the values of the ISO sensitivity, diaphragm, and the shutter speed as they are, and the adjustment value of the white balance as calculated by the image processing section 27 is used as it is. The set values are stored in EEPROM 35.

In FIG. 3, "four" is set as the number of frames and frame 1 which is a first one of the four frames is selected, and to the frame 1, "400" is set as the ISO sensitivity, "forced light emission" is set as the stroboscopic lamp 4, and "Auto" is set as the white balance, diaphragm value, and the shutter speed.

Further, in the first embodiment, when the continuous photographing is to be carried out with following stroboscopic light, the main capacitor 25 is charged before the continuous photographing and is not charged during the continuous photographing.

Figure 4:
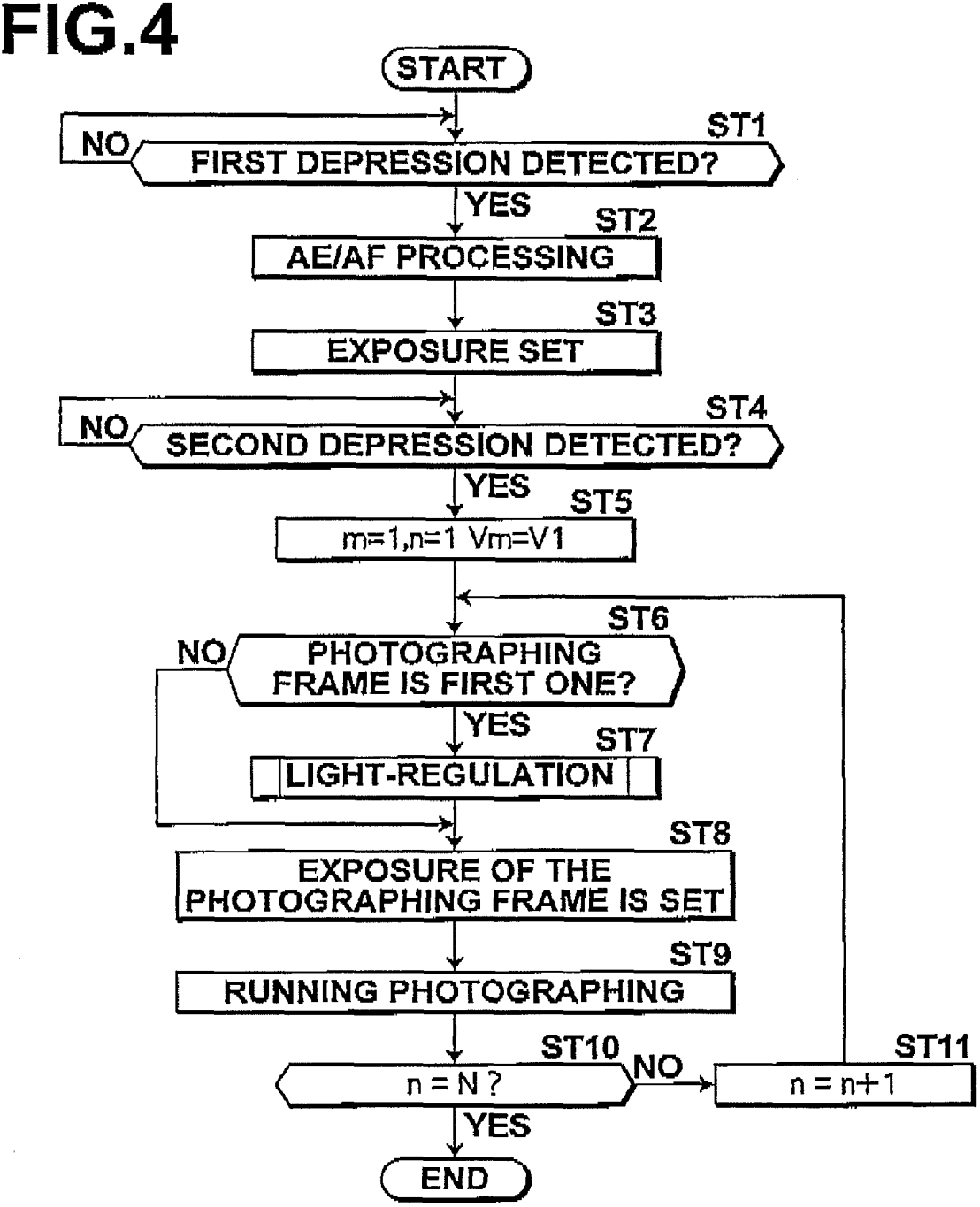
FIG. 4 is a flow chart showing processing to be carried out in a first embodiment.

Processing to be carried out in the first embodiment will be described, hereinbelow. FIG. 4 is a flow chart showing processing to be carried out in a first embodiment. Here, it is assumed that the continuous photographing has been set so that a plurality of images are taken with following stroboscopic light. Further, it is assumed that the number of frames to be exposed during the continuous photographing is set to be n (n=1 to N, N≧2), and the number of frames to be exposed during the continuous photographing with following stroboscopic light emission is set to be m (m=1 to M, M≧2). Further, it is assumed that the light emission controller 19 has full charged the main capacitor 25 at the time the continuous photographing with following stroboscopic light emission is set. In this embodiment, the main capacitor 25 is 300V in the voltage at the time when it is full charged.

The general control section 32, upon detection of the first depression (semi depression) of the shutter release button 2 (step ST1 is affirmed), sends information signal to the focus adjusting section 20 and the exposure adjusting section 21 to inform them of detection of the first depression. Upon receipt of the information signal, the focus adjusting section 20 and the exposure adjusting section 21 respectively execute the AE processing and the AF processing (AE/AF processing, step ST2). Since the exposure can be set by the frames by the setting screen 40 in this embodiment, for the frames where the ISO sensitivity, diaphragm value, and the shutter speed are set to be "Auto" by the photographer, the ISO sensitivity, diaphragm value, and the shutter speed are set by the AE processing (step ST3). For the frames where the ISO sensitivity, diaphragm value, and the shutter speed are set by the photographer, the ISO sensitivity, diaphragm value, and the shutter speed are set to be the set values (step ST3). At this time, for the frames which are the same in the settings in the setting screen 40, the exposure is set by the same setting value.

When the general control section 32 detects the second depression (full depression) of the shutter release button 2 (step ST4 is affirmed), the number n of photographing frames and the number m of the light emitting frames are set to the initial value (=1) and the remaining voltage Vm is set to the initial value V1 (step ST5). The initial value V1 of the remaining voltage Vm is a value obtained by subtracting from the voltage 300V of the main capacitor 25 when it is full charged the voltage necessary for a pre-light emission to be described later. Then the general controller 32 determines whether the frame is a first one with following stroboscopic light (step ST6). When step ST6 is affirmed, the light-regulation processing is executed.

Figure 5:
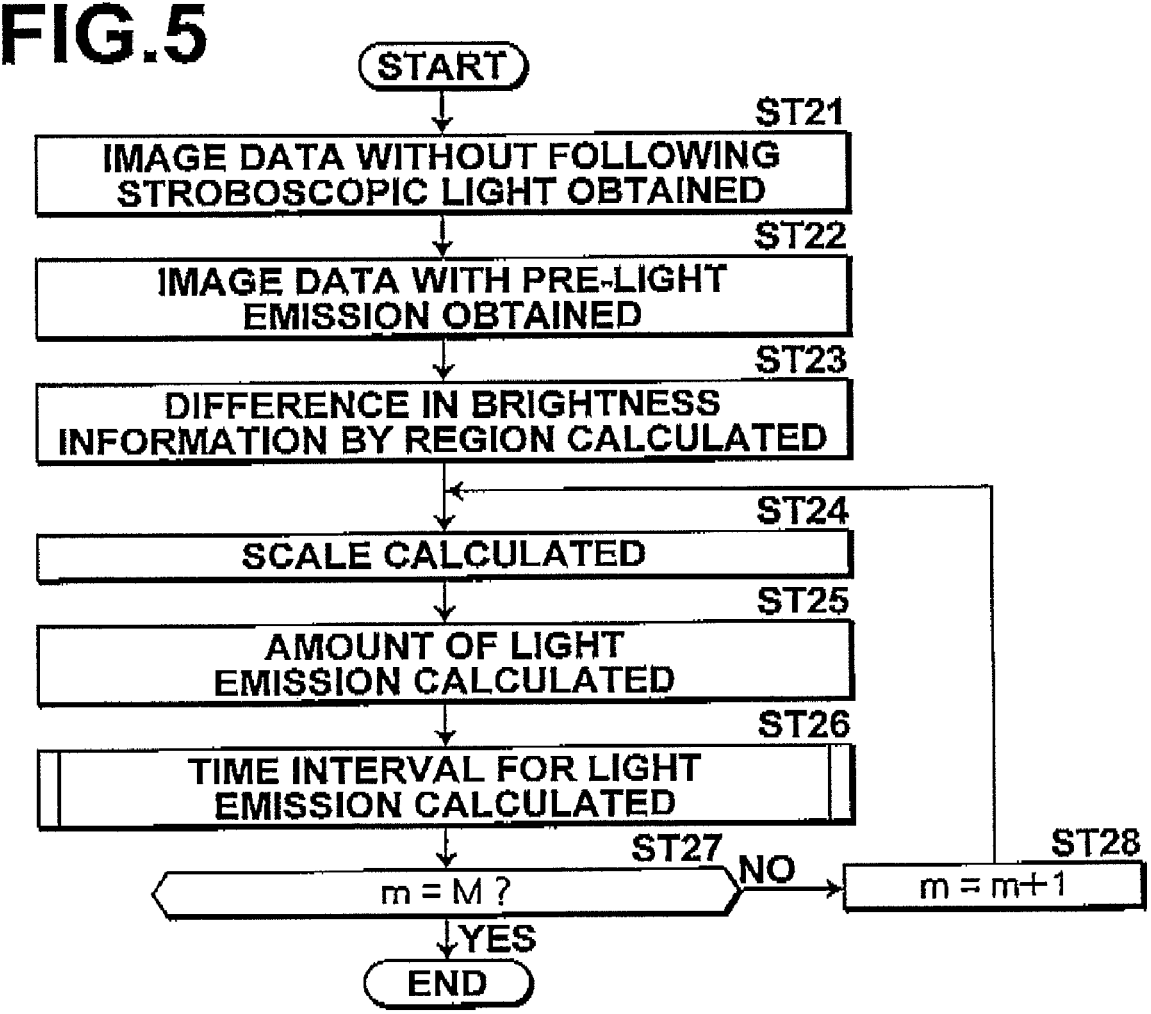
FIG. 5 is a flow chart showing light-regulation processing.

FIG. 5 is a flow chart showing the light-regulation processing. When the general control section 32 sends out a signal instructing the start of the light-regulation processing to the light regulating section 19, the light regulating section 19 obtains an image photographed without following stroboscopic light, that is, the newest image data in the SDRAM 22 (step ST21). Further, the light regulating section 19 executes the pre-light emission of the stroboscopic lamp 4 and obtains image data stored in the SDRAM 22 by the pre-light emission of the stroboscopic lamp 4 (step ST22).

Figure 6:
FIG. 6 is a view showing an example of division into region blocks.

Then the light emission controller 19 divides into a plurality of region blocks the image data representing the image photographed without following stroboscopic light and the image data representing the image photographed under the pre-light emission of the stroboscopic lamp 4 and calculates the difference in the brightness information by the image data (step ST23). FIG. 6 is a view showing an example of division into region blocks, and shows the state where the image represented by the image data photographed without following stroboscopic light and the image represented by the image data photographed under the pre-light emission of the stroboscopic lamp 4 is divided into i×j (8×8, here) region blocks. In the following description, the region blocks different in positions are distinguished from each other by singes such as (1, 1) or (i, j).

The light emission controller 19 obtains a plurality of pieces of brightness information without following stroboscopic light Ya (1, 1) to Ya (i, j) by the region blocks of the images photographed without following stroboscopic light. For example, the image data when photographing without following stroboscopic light is RGB-YCC converted to obtain a brightness value of each pixel, the average of the brightness values of the pixels is obtained by the region blocks, which averages are taken as the plurality of pieces of brightness information without following stroboscopic light Ya. As for the image data photographed under the pre-light emission of the stroboscopic lamp 4, the plurality of pieces of brightness information with following pre-light emission Yb(1, 1) to Yb(i, j) are obtained by the region blocks in the similar manner. Then, the light emission controller 19 calculates the difference Yd(x, y) (=Yb (x, y)−Ya (x, y)) between the brightness information without following stroboscopic light Ya and the brightness information with following pre-light emission Yb by the region blocks. The difference Yd(x, y) forms reflected brightness information.

On the basis of the differences Yd(1, 1) to Yd(i, j), of all the region blocks, the scale Hm of the amount of light emission to the pre-light emission when photographing is executed with following stroboscopic light is calculated (step ST24). For example, the simple average Ydh or the weighted average Yah of the differences Yd(1, 1) to Yd (i, j) and the brightness information without following stroboscopic light Ya(1, 1) to Ya(i, j) is calculated and the scale Hm of the amount of light emission to the pre-light emission necessary for the target brightness is calculated according to the following formula (1).

the scale $Hm=(Yo-Yah)/Ydh$ (1)

Figures 7, 8, 9:
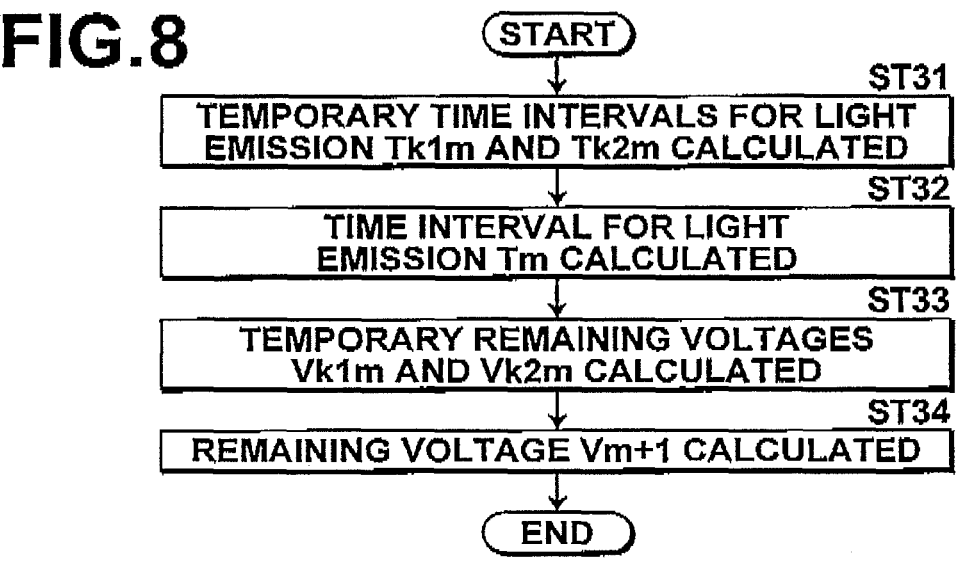
FIG. 7 is a view showing a weight coefficient of each region block.
FIG. 8 is a flow chart showing processing of calculating light emission time interval.
FIG. 9 is a view showing tables where various amounts of light emission are linked with light emission time interval.

When the weighted average is obtained, for instance, region blocks nearer to the center of the image should be increased in the weight as shown in FIG. 7.

Further, the light emission controller 19 calculates the amount of light emission Evsm from the stroboscopic lamp 4 according to the following formula (2) (step ST25).

$Evsm=\log_2 Hm$ (2)

It is preferred that the amount of light emission Evsm of a frame the same as another frame in exposure be set to be the amount of light emission Evsm of the frame without the calculation again. By this, the time required to the calculation of the amount of light emission Evsm can be shortened. Then the light emission controller 19 executes processing of calculating light emission time interval (step ST26).

FIG. 8 is a flow chart showing the processing of calculating light emission time interval. The light emission controller 19 first calculates the temporary light emission time intervals Tk1$m$ and Tk2$m$ to the amount of light emission Evsm (step ST31). FIG. 9 is a view showing tables LUT1 and LUT2 where various amounts of light emission are linked with light emission time interval, and FIG. 10 is a view for describing calculation of light emission time interval. In the table LUT1, the relation of the amounts of light emission (2.0, 1.0, −1.0, −2.0) and the light emission time interval corresponding to the reference voltage Vr1 is defined while in the table LUT2, the relation of the amounts of light emission (2.0, 1.0, −1.0, −2.0) and the light emission time interval corresponding to the reference voltage Vr2 is defined. The Vr1>Vr2, and the unit of the light emission time interval is μs. The reference voltage Vr1 is 300V which is the remaining voltage in the main capacitor 25 when it is charged full in the first embodiment.

The light emission controller 19 calculates the temporary light emission time intervals Tk1$m$ and Tk2$m$ by linear interpolation with reference to the tables LUT1 and LUT2 by the use of the amount of light emission Evsm. For example, when the amount of light emission Evsm is 0.5, the temporary light emission time interval Tk1$m$ is calculated to be 25.9 μs from 21.2 μs and 30.5 μs respectively corresponding to the amounts of light emission Evsm of 0.0, and 1.0. Further, the temporary light emission time interval Tk2$m$ is calculated to be 41.5 μs from 34.0 μs and 49.0 μs respectively corresponding to the amounts of light emission Evsm of 0.0, and 1.0. The light emission controller 19 calculates the temporary light emission time intervals Tk1$m$ and Tk2$m$ to be the values as defined in the tables LUT1 and LUT2 without the interpolation when the amounts of light emission Evsm is the same as those defined in the tables LUT1 and LUT2.

Then the light emission controller 19 calculates light emission time intervals Tm by linear interpolation according to the following formula (3) with the remaining voltage Vm from the temporary light emission time intervals Tk1$m$ and Tk2$m$ (step ST32).

$Tm=\{(Vm-Vr2),*Tk1m+(Vr1-Vm)*Tk2m\}/(Vr1-Vr2)$ (3)

When, for instance, Vr1=300V, Vr2=250V, the remaining voltage Vm=275V, Tk1$m$=25.9 μs and Tk2$m$=41.5 μs, Tm is calculated as 33.7 μs.

Then the estimating section 26 calculates the temporary remaining voltages Vk1$m$ and Vk2$m$ after light emission at the amounts of light emission Evsm (step ST33). FIG. 11 is a view showing a table LUT3 and a table LUT4 where various amounts of light emission are linked with remaining voltages, and FIG. 12 is a view for describing calculation of the remaining voltage. In the table LUT3, the relation of the amounts of light emission (2.0, 1.0, −1.0, −2.0) and the remaining voltages corresponding to the reference voltage Vr1 is defined, while in the table LUT4, the relation of the amounts of light emission and the remaining voltages corresponding to the reference voltage Vr2 is defined. Further, Vr1>Vr2 and the unit of the remaining voltages is V.

The estimating section 26 calculates the temporary remaining voltages Vk1$m$ and Vk2$m$ by linear interpolation with reference to the tables LUT3 and LUT4 by the use of the amount of light emission Evsm. For example, when the amount of light emission Evsm is 0.5, the temporary remaining voltage Vk1$m$ is calculated to be 263.5V from 267V and 260V respectively corresponding to the amounts of light emission Evsm of 0.0, and 1.0 in view of the tables LUT3 and LUT4. Further, the temporary remaining voltage Vk2$m$ is calculated to be 218.5V from 222V and 215V respectively corresponding to the amounts of light emission Evsm of 0.0, and 1.0. The estimating section 26 calculates the temporary remaining voltages Vk1$m$ and Vk2$m$ to be the values as defined in the tables LUT3 and LUT4 without the interpolation when the amounts of light emission Evsm is the same as those defined in the tables LUT3 and LUT4.

Then the estimating section 26 calculates the temporary remaining voltages Vk1$m$ and Vk2$m$ by the use of the current remaining voltage Vm and calculates (step ST34) remaining voltage in the main capacitor 25, that is, the remaining voltage Vm+1 for light emission from the stroboscopic lamp 4 for the next frame m+1 according to the following formula (4) by the use of the temporary remaining voltages Vk1m and Vk2m and calculation of the time interval for light emission is ended.

$$Vm+1=\{(Vm-Vr2)*Vk1m+(Vr1-Vm)*Vk2m\}/(Vr1-Vr2) \quad (4)$$

When, for instance, Vr1=300V, Vr2=250V, the remaining voltage Vm=275V, Vk1m=263.5FV and Vk2m=218.5V, the remaining voltage Vm+1 is calculated as 241V.

Further, though in the above processing of calculating light emission time interval, the steps ST31 and ST32 are done prior to the steps ST33 and ST34, the steps ST33 and ST34 may be done prior to the steps ST31 and ST32.

Returning to FIG. 5, the general control section 32 determines whether the current frame with following light emission is the last frame with following light emission (m=M, step ST27). When step ST27 is denied, the processing returns to step ST24 after setting the frame with following light emission where the time interval of light emission is to be calculated as the next frame (m=m+1, step ST28). Further, in second and the following processing of calculating light emission time interval, the light emission time interval Tm and the remaining voltage Vm+1 in the main capacitor 25 are calculated.

Returning to FIG. 4, when step ST6 is denied and after step ST7, the general control section 32 sets the exposure for all the frames (step ST8). In the processing in step ST8, when the frame is a frame with following light emission, the exposure set in step ST3 is used while the amount of light emission from the stroboscopic lamp 4 and the light emission time interval are set as the Evsm and Tm respectively.

Then, the general control section 32 executes the running photographing (step ST9). In the running photographing, the light emission from the stroboscopic lamp 4 (running light emission) and obtainment of the images are carried out in synchronization with each other under the instruction of the general control section 32. The light emission controller 19 emits light from the stroboscopic lamp 4 in the amount of light emission Evsm and a light emission time interval Tm determined in the light emission control processing under the instruction of the general control section 32. At the same timing, the exposure control section 21 transfers the diaphragm value and the shutter speed to the diaphragm driver 17 and the timing generator 18 and the ISO sensitivity to the AFE 14. Further, the image input control section 23 transfers the image data supplied from the A/D converter 15 to the image processing section 27. The image processing section 27 carries out the image processing on the image data.

At this time, the image processing includes the white balance adjustment processing by the adjustment value (including "Auto") set by the setting screen 40. On image data obtained by the photographings which are the same in the manner of exposure and the light emission from the stroboscopic lamp 4 and in which the white balance has been set to "Auto", the white balance adjustment processing is done by the same adjustment value. By this, the time necessary for the white balance adjustment processing can be shortened.

Then, the image processing section 27 transfers the processed image data to the recording/reading controller 30. The recording/reading controller 30 records it in a memory card 31. Thus, the photographing is ended.

Then, the general control section 32 determines whether the current frame is the last frame (n=N, step ST10). When step ST10 is denied, the processing returns to step ST6 after executing step ST11 where the frame is set to the next frame (n=n+1, step ST11). Further, when step ST10 is affirmed, the processing is ended.

Thus, in the first embodiment, when the photographing with following stroboscopic light is executed a plurality of times, the remaining energy in the main capacitor 25 after the photographing is estimated on the basis of each light emission and the remaining energy in the main capacitor 25 upon the light emission. Accordingly, on the basis of the estimated remaining energy in the main capacitor 25, the light emission time interval Tm can be calculated without adding a unit for measuring the remaining energy in the main capacitor 25 to the system. Accordingly, the time interval Tm of light emission when photographing the images with following stroboscopic light can be calculated with less cost without complicating the hard structure of the image taking system.

A second embodiment of the present invention will be described, hereinbelow. Since the digital camera 1 of the second embodiment differs from the digital camera 1 of the first embodiment only in the processing to be executed, the detailed description of the structure will be abbreviated, here. In the second embodiment, in the plurality of photographings with following stroboscopic light, the photographings are done in the order in which the amounts of light emission decrease after the calculation of the amount of light emission.

Figure 13:
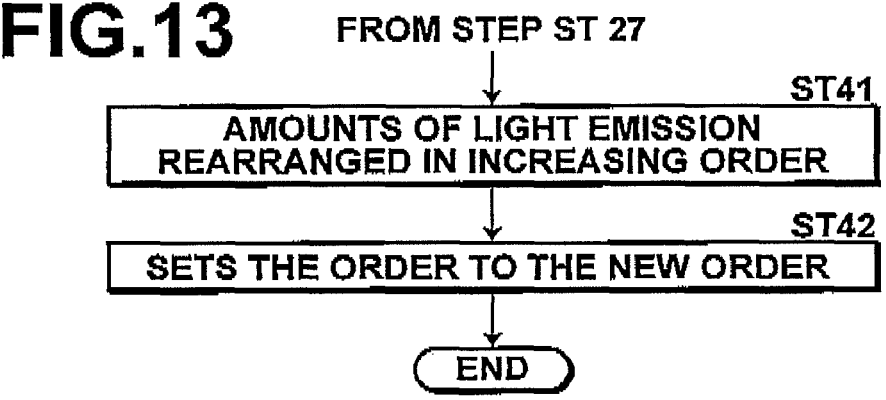
FIG. 13 is a flow chart showing processing to be carried out in a second embodiment.

FIG. 13 is a flow chart showing processing to be carried out in the second embodiment. The flow chart shown in FIG. 13 shows the processing to be carried out after the light-regulation processing in the first embodiment, i.e., step ST27.

After step ST27, the amounts of light emission Evsm are rearranged in the order in which the amounts of light emission increase after step ST27 (step ST41) and the rearranged amounts of light emission Evsm are set the new order (step ST42) and then the processing is ended. With this arrangement, the photographings are done in the order in which the amounts of light emission decrease after the calculation of the amount of light emission.

The stroboscopic lamp 4 has a minimum light emission voltage and the stroboscopic lamp 4 would not unless the main capacitor 25 is charged not less than the minimum light emission voltage. In the second embodiment, the photographings are done in the order in which the amounts of light emission decrease and accordingly there is a weak probability that the remaining voltage of the main capacitor 25 becomes lower than the minimum light emission voltage at the later stage in the plurality of photographings with following stroboscopic light. Accordingly, the stroboscopic lamp 4 can be prevented from being not operated in the plurality of photographings with following stroboscopic light.

Though, in the second embodiment, the photographings are done in the order in which the amounts of light emission decrease, the remaining voltage in the main capacitor 25 may be lower than the minimum light emission voltage. For this purpose, in the last time in photographing with following stroboscopic light, the photographing where the amount of light emission is maximized may be executed with the preceding photographings done randomly without the amounts of light emission taken into the account.

A third embodiment of the present invention will be described, hereinbelow. Since the digital camera 1 of the third embodiment differs from the digital camera 1 of the first embodiment only in the processing to be executed, the detailed description of the structure will be abbreviated, here. In the third embodiment, when there is a photographing where the remaining voltage in the main capacitor 25 becomes lower than the minimum light emission voltage in the plurality of photographings with following stroboscopic light, the amount of light is suppressed in photographings with following stroboscopic light emission.

Figure 14:
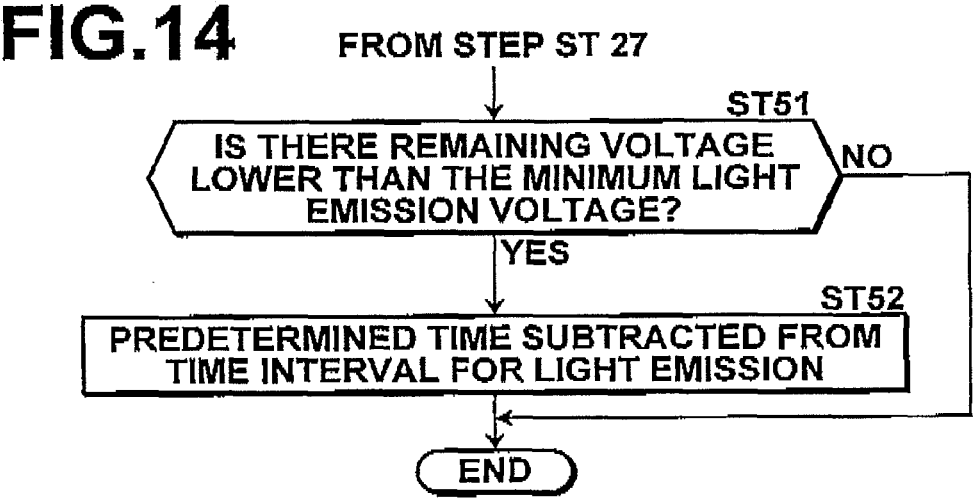
FIG. 14 is a flow chart showing processing to be carried out in a third embodiment.

FIG. 14 is a flow chart showing processing to be carried out in a third embodiment. The flow chart shown in FIG. 14 shows the processing to be carried out after the light-regulation processing in the first embodiment, i.e., step ST27. After step ST27, whether there is a remaining voltage Vm where the remaining voltage Vm in the main capacitor 25 becomes lower than the minimum light emission voltage is determined (step ST51). When step ST51 is denied, the processing is ended. When step ST51 is affirmed, a predetermined time interval are subtracted from the time intervals of light emission Tm calculated for all the frames m (step ST52) and the processing is ended. The predetermined time interval is selected so that, in all the frames m to emit light, the remaining voltage Vm in the main capacitor 25 after the light emission becomes not lower than the minimum light emission voltage.

With this arrangement, the time intervals of light emission for all the frames m to emit light are shortened, whereby the amount of light emission is suppressed. Further, when the amount of light emission is suppressed in the photographing of all the frames with following stroboscopic light, the remaining voltage in the main capacitor 25 after the light emission becomes not lower than the minimum light emission voltage and accordingly, the stroboscopic lamp 4 can be prevented from being not operated in the plurality of photographings with following stroboscopic light. The images obtained by the photographing are underexposure since the amount of light is short. However, since amount of light emission is uniformly suppressed in all the frames with following stroboscopic light, the relation of the exposure can be held in all the frames with following stroboscopic light.

Further, in the third embodiment, though the amount of light emission is suppressed by shortening the time interval Tm of light emission, the amount of light emission may be suppressed by calculating first the amount of light emission Evsm for all the frames m with following stroboscopic light and a predetermined amount is subtracted from each amount of light emission Evsm calculated for all the frames m and on the basis of a predetermined-amount-subtracted amount of light emission Evsm.

Further, in the third embodiment, though the amount of light emission is suppressed in all the photographings with following stroboscopic light, since the remaining voltage in the main capacitor 25 becomes lower than the minimum light emission voltage after the light emission in the last photographing with following stroboscopic light, it is not necessary that the amount of light emission is suppressed in the last photographing with following stroboscopic light.

Further, in the third embodiment, though the amount of light emission are suppressed in all the photographings, only frames to be photographed prior to the frames where the remaining voltage Vm in the main capacitor 25 becomes lower than the minimum light emission voltage may be suppressed in the amount of light emission.

Further, in the third embodiment, though the amounts of light emission are suppressed in the first embodiment, the third embodiment may be applied to the second embodiment so that the light emissions are done and the amounts of light emission are suppressed in the order in which the amounts of light emission decrease.

A fourth embodiment of the present invention will be described, hereinbelow. Since the digital camera 1 of the fourth embodiment differs from the digital camera 1 of the first embodiment only in the processing to be executed, the detailed description of the structure will be abbreviated, here. In the fourth embodiment, when there is a photographing where the remaining voltage in the main capacitor 25 becomes lower than the minimum light emission voltage in the plurality of photographings with following stroboscopic light, the photographings are done in the order in which the amounts of light emission decrease.

Figure 15:
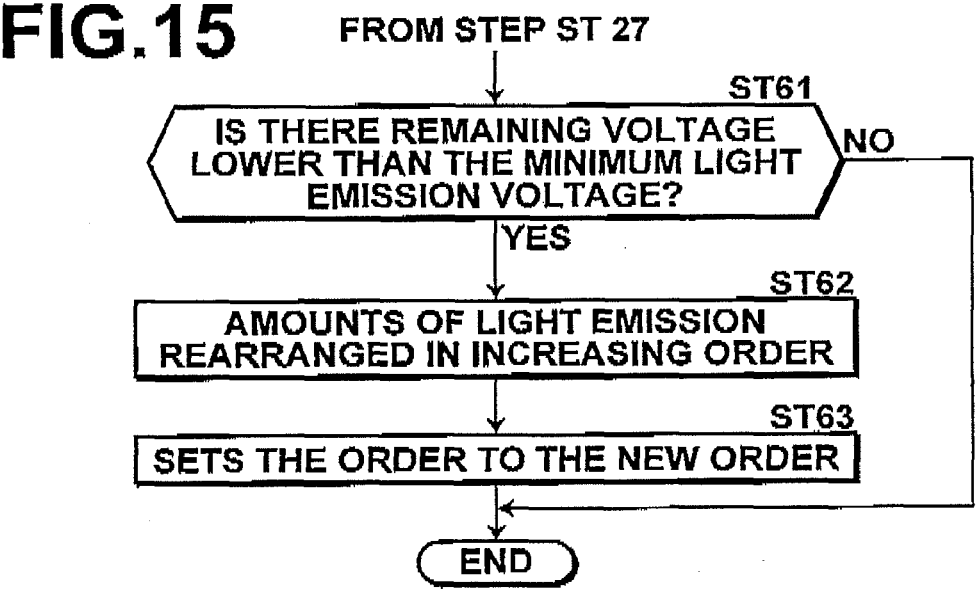
FIG. 15 is a flow chart showing processing to be carried out in a fourth embodiment.

FIG. 15 is a flow chart showing processing to be carried out in the fourth embodiment. The flow chart shown in FIG. 15 shows the processing to be carried out after the light-regulation processing in the first embodiment, i.e., step ST27. After step ST27, whether there is a remaining voltage Vm where the remaining voltage Vm in the main capacitor 25 becomes lower than the minimum light emission voltage is determined (step ST61). When step ST61 is denied, the processing is ended. When step ST61 is affirmed, the amounts of light emission are rearranged into the order in which the amounts of light emission decrease (step ST62) and the rearranged order of the amounts of light emission Evsm is set as the new order and the processing is ended (step ST63). With this arrangement, the photographings are done in the order in which the amounts of light emission decrease.

Though, in the fourth embodiment, the photographings are done in the order in which the amounts of light emission decrease, the remaining voltage in the main capacitor 25 may become lower than the minimum light emission voltage after the light emission in the last photographing with following stroboscopic light. For this purpose, in the last time photographing with following stroboscopic light, the photographing where the amount of light emission is maximized may be executed with the preceding photographings done randomly without the amounts of light emission taken into the changed account.

Though, in the above fourth embodiment, the photographing order is changed in the first embodiment, the fourth embodiment may be applied to the third embodiment so that the light emissions are done and the amounts of light emission are suppressed in the order in which the amounts of light emission decrease.

A fifth embodiment of the present invention will be described, hereinbelow. Since the digital camera 1 of the fifth embodiment differs from the digital camera 1 of the first embodiment only in the processing to be executed, the detailed description of the structure will be abbreviated, here. In the fifth embodiment, when there is a photographing where the remaining voltage in the main capacitor 25 becomes lower than the minimum light emission voltage in the plurality of photographings with following stroboscopic light, an alarm is made.

Figure 16:
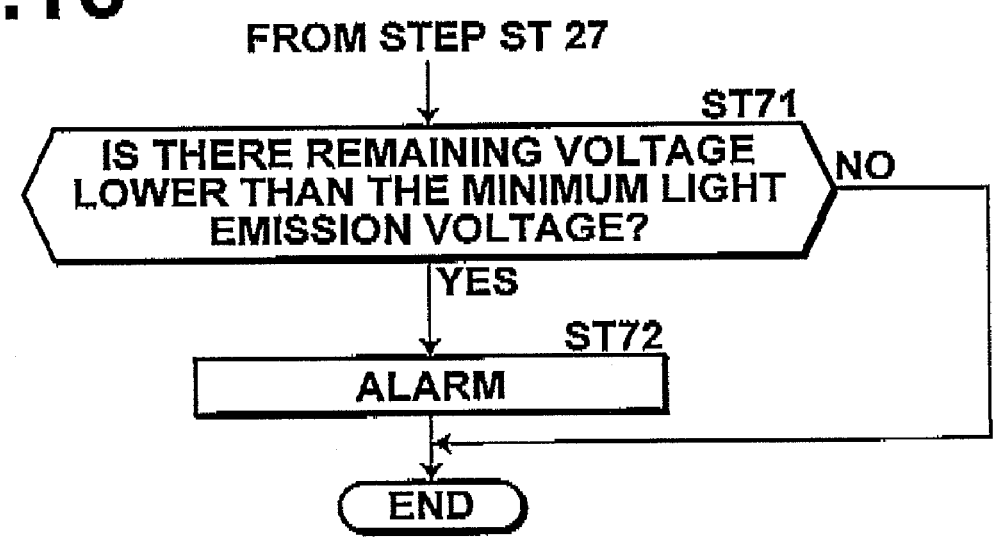
FIG. 16 is a flow chart showing processing to be carried out in a fifth embodiment.

FIG. 16 is a flow chart showing processing to be carried out in the fifth embodiment. The flow chart shown in FIG. 16 shows the processing to be carried out after the light-regulation processing in the first embodiment, i.e., step ST27. After step ST27, whether there is a remaining voltage Vm where the remaining voltage in the main capacitor 25 becomes lower than the minimum light emission voltage in the remaining voltage Vm is determined (step ST71). When step ST71 is denied, the processing is ended. When step ST71 is affirmed, the general controller 32 makes an alarm (step ST72) and then, the processing is ended. After making the alarm, either the third or fourth embodiment may be done.

As the alarm, as well as the alarm message on the liquid crystal monitor 29, the alarm message by the voice, or lighting or brink of an alarm lamp may be employed so long as it represents that there is a photographing where the remaining voltage in the main capacitor 25 becomes lower than the minimum light emission voltage. When making the alarm when there is a photographing where the remaining voltage in the main capacitor 25 becomes lower than the minimum light emission voltage, it is possible to inform the effect of the photographer. Accordingly, the photographer can know that the light emission is sometimes suppressed in photographing and the photographing order is sometimes changed, whereby the photographer can carry out later on the images obtained in the photographing a suitable image processing such as increasing the brightness of the image.

In the above fifth embodiment, the third or fourth embodiment need not be done after making the alarm. In this case, the photographer can know in advance by the alarm that the stroboscopic light is sometimes not emitted.

A sixth embodiment of the present invention will be described, hereinbelow. Since the digital camera 1 of the sixth embodiment differs from the digital camera 1 of the first embodiment only in the processing to be executed, the detailed description of the structure will be abbreviated, here. Though calculations of the time interval Tm for the light emission and the remaining voltage Vm+1 are executed together in step ST26 in the above first embodiment, the sixth embodiment differs from the first embodiment in that calculations of the time interval Tm for the light emission and the remaining voltage Vm+1 are executed separately.

Figure 17:
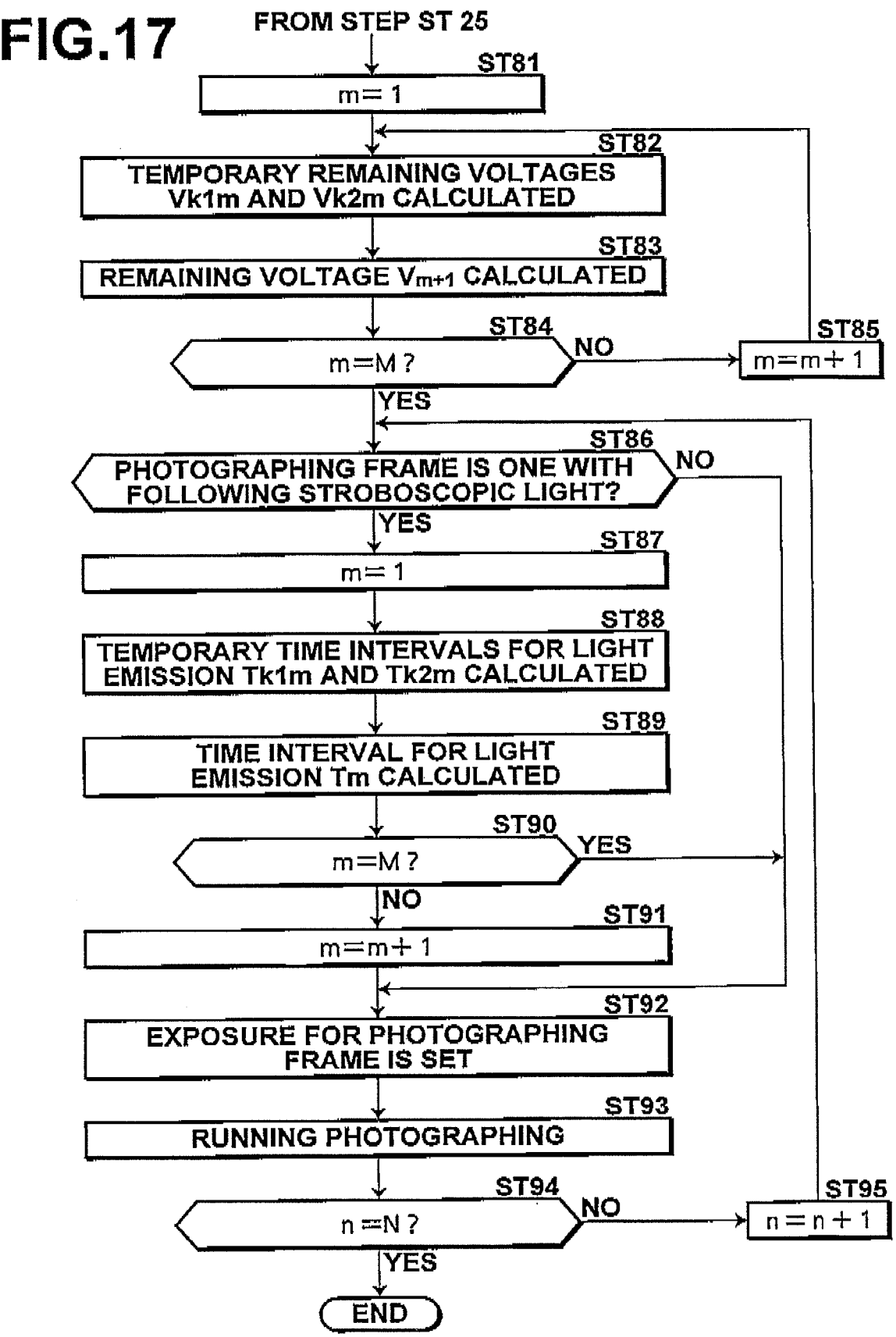
FIG. 17 is a flow chart showing processing to be carried out in a sixth embodiment.

The processing to be carried out in the sixth embodiment will be described, hereinbelow. FIG. 17 is a flow chart showing processing to be carried out in the sixth embodiment. The flow chart shown in FIG. 17 shows the processing to be carried out after the light-regulation processing in the first embodiment, i.e., step ST25. Here, calculations of the time interval Tm for the light emission and the remaining voltage Vm+1 are executed in this order.

After step ST25, the frame where the remaining voltage is to be calculated is set to the initial value (m=1) (step ST81), and the estimating section 26 calculates the temporary remaining voltages Vk1m and Vk2m in the main capacitor 25 in the same manner as in steps ST33 and ST34 (step ST82) and then the remaining voltage Vm+1 in the main capacitor 25 after the light emission is calculated (step ST83). Then the general control section 32 determines whether the current frame with following stroboscopic light is the last one (m=M, step ST84). When step ST84 is denied, the processing returns to step ST82 after the frame with following stroboscopic light is set to the next frame with following stroboscopic light (m=m+1, step ST85). Calculation of the remaining voltage in the second and the followings are executed by the use of the remaining voltage calculated in step ST83.

When the remaining voltage is calculated for all the frames m with following stroboscopic light and step ST84 is affirmed, the general control section 32 determines whether the current frame is with following stroboscopic light (step ST86). When step ST86 is affirmed, the frame where the light emission time interval Tm is to be calculated is set to the initial value (m=1) (step ST87), and the light emission control section 19 calculates the temporary light emission time intervals Tk1m and Tk2m in the main capacitor 25 in the same manner as in steps ST31, and ST32 (step ST88), then the light emission time interval Tm is calculated (step ST89). When step ST86 is denied, the processing proceeds to step ST92 to be described later. Then the general control section 32 determines whether the current frame with following stroboscopic light is the last one (m=M, step ST90). When step ST90 is denied, the general control section 32 sets the frame with following stroboscopic light the time interval for which is to be calculated to the next frame with following stroboscopic light (m=m+1, step ST91).

When step ST90 is affirmed, and the general control section 32 sets the exposure as in steps ST8 and ST9 after step ST91 (step ST92), the running photographing is executed (step ST93). Then the general control section 32 determines whether the current frame is the last one (n=N, step ST94). When step ST94 is denied, the processing returns to step ST86 after the frame is set to the next frame (n=n+1, step ST95). When step ST94 is affirmed, the processing is ended.

When calculations of the time interval Tm for the light emission and the remaining voltage Vm+1 are executed together as in the first embodiment, since the movement of result of is little in time series, the program to process can be simple in arrangement. However, since the time required for the calculations is elongated, there is a fear that calculations of the time interval Tm for the light emission and the remaining voltage Vm+1 are not in time of the running photographing depending on the performance of the CPU 33. In the sixth embodiment, since calculations of the time interval Tm for the light emission and the remaining voltage Vm+1 are executed separately, the calculations can be smoothly executed, and as a result, the light-regulation processing and the running photographing can be smoothly executed.

Also, in the above second to fifth embodiments, calculations of the time interval Tm for the light emission and the remaining voltage Vm+1 may be executed separately.

A seventh embodiment of the present invention will be described, hereinbelow. Since the digital camera 1 of the seventh embodiment differs from the digital camera 1 of the first embodiment only in the processing to be executed, the detailed description of the structure will be abbreviated, here. In the seventh embodiment, when there is a photographing where the remaining voltage in the main capacitor 25 after the light emission becomes lower than the minimum light emission voltage, the main capacitor 25 is charged after photographing of the light emission.

Figure 18:
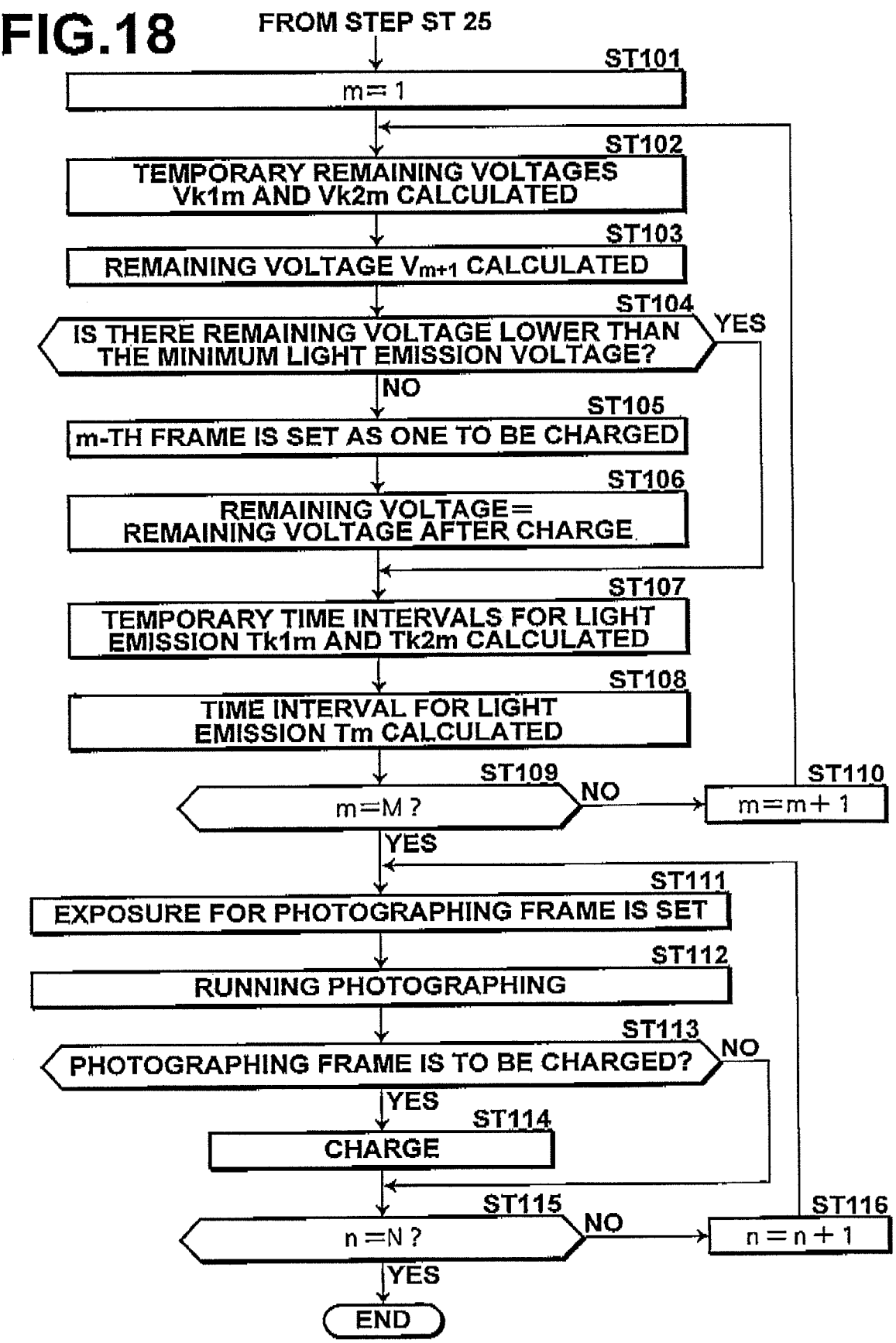
FIG. 18 is a flow chart showing processing to be carried out in a seventh embodiment.

FIG. 18 is a flow chart showing processing to be carried out in the seventh embodiment. The flow chart shown in FIG. 18 shows the processing to be carried out after the light-regulation processing in the first embodiment, i.e., step ST25. Here, it is assumed that the remaining voltage Vm+1 and the time interval Tm for the light emission are calculated in this order.

After step ST25, the frame where the remaining voltage is to be calculated is set to the initial value (m=1) (step ST101), and the estimating section 26 calculates the temporary remaining voltages Vk1m and Vk2m in the main capacitor 25 in the same manner as in steps ST33, and ST34 (step ST102) and then the remaining voltage Vm+1 in the main capacitor 25 after the light emission (step ST103). Further, the general control section 32 determines whether the remaining voltage Vm+1 is lower than the minimum light emission voltage (step ST104). When step ST104 is denied, the general control section 32 sets m-th frame of the light emission to the frame to be charged (step ST105) and sets the remaining voltage Vm+1 to the remaining voltage after charge (step ST106).

Calculation after charge will be described, hereinbelow.

Figures 19, 20:
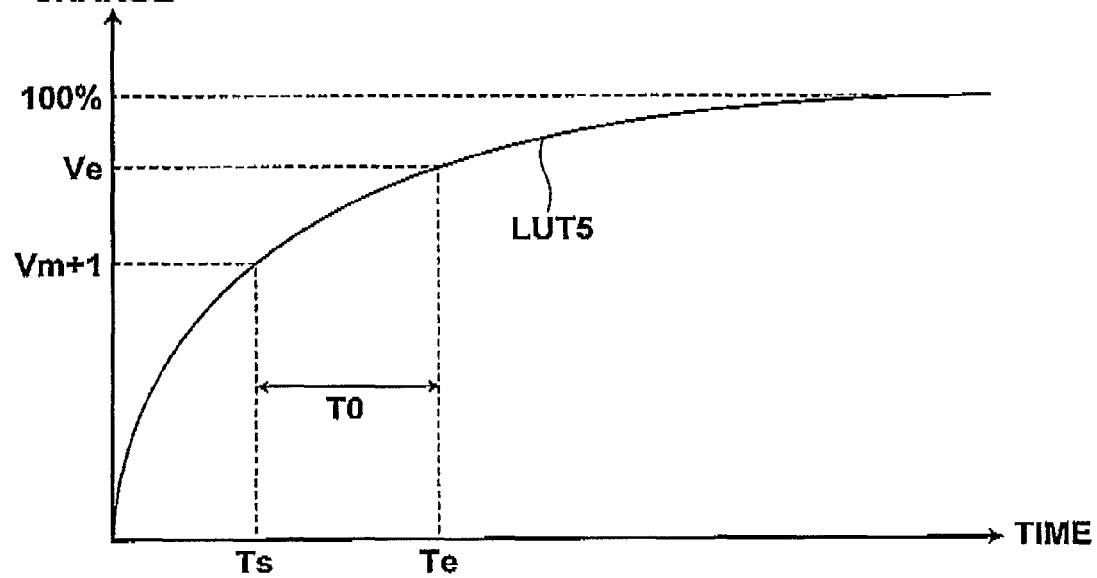
FIG. 19 is a view showing a relation between the charging time of the main capacitor and the remaining voltage.
FIG. 20 is a view showing the continuous photographing information.

FIG. 19 is a view showing a relation between the charging time and the remaining voltage of the main capacitor 25. In the seventh embodiment, for the relation shown in FIG. 19 is stored in a EEPROM 35. The estimating section 26 calculates a charge starting time Ts with reference to the table LUT5 on the basis of the remaining voltage Vm+1 calculated in step ST103. And the estimating section 26 obtains the voltage Ve with reference to the table LUT5 at a charge terminating time Te (=Ts+T0) a predetermined charge time T0 after the charge starting time Ts. The estimating section 26 sets the voltage Ve thus obtained as the remaining voltage after charge. As the charge time T0, for instance, the time from the time photographing is ended to the time photographing becomes feasible may be employed.

When the main capacitor 25 is to be charged, since the charging current can be changed, it is preferred that a plurality of tables LUT5 be stored in the EEPROM 35 according to the kinds of the charging currents.

Returning to FIG. 18, when step ST104 is affirmed, and the light emission control section 19 calculates the temporary light emission time intervals Tk1$m$ and Tk2$m$ as in steps ST31 and ST32 after step ST106 (step ST107), and then the light emission time interval Tm (step ST108). Then the general control section 32 determines whether the current frame with following stroboscopic light is the last one (m=M, step ST109). When step ST109 is denied, the processing returns to step ST102 after the frame for which the light emission time interval Tm is to be calculated is set to the next frame (m=m+1, step ST110). Calculation of the remaining voltage Vm+1 and the light emission time interval Tm in the second and the followings are executed by the use of the remaining voltage calculated in step ST103 or the remaining voltage after the charge set in step ST106.

When step ST109 is affirmed, the general control section 32 sets the exposure as in steps ST8 and ST9 (step ST111) and executes the running photographing (step ST112). Then, the general control section 32 determines whether the frame is a frame to be charged (step ST113). When step ST113 is affirmed, the main capacitor 25 is charged (step ST114). When step ST113 is confirmed and following step ST114, the general control section 32 determines whether the current photographing frame is the last one (n=N, step ST115). If the result of the determination at step ST115 is negative, the processing returns to step ST111 after setting the current photographing frame as the next photographing frame (n=n+1, step ST116). When step ST115 is affirmed, the processing is ended.

The main capacitor 25 is charged last when the remaining voltage becomes lower than the minimum light emission voltage in the seventh embodiment. Accordingly, the photographing can be constantly carried out at an optimum amount of light emission.

Further, in the above seventh embodiment, the charge when the remaining voltage becomes lower than the minimum light emission voltage may be executed until the main capacitor 25 is full charged.

Also, in the above second to sixth embodiments, the main capacitor 25 may be charged when the remaining voltage becomes lower than the minimum light emission voltage.

Further, in the above first to seventh embodiments, the remaining voltage, the amount of light emission and the time interval for light emission upon each photographing may be attached to the image data obtained by the running photographing as the continuous photographing information. In this case it is preferred that the set value of the exposure, i.e., the ISO sensitivity, the diaphragm value and the shutter speed, be included in the continuous photographing information.

FIG. 20 is a view showing the continuous photographing information. As shown in FIG. 20, the continuous photographing information includes information on the set values of the exposure (i.e., the ISO sensitivity, the diaphragm value and the shutter speed), the remaining voltage, the amount of light emission and the light emission time interval. FIG. 20 shows the continuous photographing information for three frames and the continuous photographing information for each frame is provided to the corresponding frame. As the method of providing the continuous photographing information may include any method so long as it can record the continuous photographing information to be inseparable from the image data including, as well as recording it on a tag of the image data, recording it on text data having the same file name as the image data.

By thus providing the continuous photographing information to the image data, the image data can be suitably image-processed later referring to the continuous photographing information. For example, when the amount of light emission is a little though the ISO sensitivity is low, the image is possibly low in brightness. Accordingly, the image data can be image-processed to increase the brightness. Further, when the ISO sensitivity is high, it is a strong probability that the image feels the granularity. Accordingly, the image data has a priority to the image-processing to remove noise.

Further, in the above first to seventh embodiments, though the amount of light emission is calculated by the light-regulation processing, it is not necessary to carry out the light-regulation processing, but the amount of light emission may be calculated on the basis of the focusing distance calculated by the AF processing, the ISO sensitivity, the diaphragm value and the shutter speed calculated by the AE processing, or the like.

Though the digital camera 1 in accordance with the embodiments of the present invention have been described, hereinbelow, the programs which cause a computer to execute one of the methods such as shown in FIGS. 4, 5, 8, 7 and 13 to 18 are embodiments of the present invention. Also, a computer-readable recording medium on which one of such methods has been recorded is one of embodiments of the present invention.

What is claimed is:

1. An image taking system comprising
    an image taking unit which photographs the object upon receipt of a photographing instruction and obtains an image representing the object,
    a light emitting unit which emits stroboscopic light,
    a charging unit which stores energy for emitting the stroboscopic light,
    a photographing control unit which controls the image taking unit to execute a continuous photographing where a plurality of images are continuously taken including a plurality of images with accompanying stroboscopic light,
    a stroboscopic light control unit which controls the light emitting unit to emit the stroboscopic light when photographing the images with accompanying stroboscopic light, and
    an estimating unit which estimates, when photographing the images with accompanying stroboscopic light, the remaining energy in the charging unit after the photographing, on the basis of each light emission and the remaining energy in the charging unit upon the light emission,
    wherein when there is a photographic operation in which the estimated remaining energy in the charging unit is smaller than a predetermined value, the photographing control unit executes at least the photographing of the last of the plurality of images which are to be continuously taken with accompanying stroboscopic light.

2. An image taking system as defined in claim 1 in which the estimating unit estimates the remaining energy in the charging unit after the photographing with reference to a first table where the remaining energy in the charging unit after the photographing is determined on the basis of the relation to various light emissions and predetermined first remaining energy and a second table where the remaining energy in the charging unit after the photographing is determined on the basis of the relation to various light emissions and predetermined second remaining energy different from the first remaining energy.

3. An image taking system as defined in claim 1 in which the photographing control unit is a unit for executing the photography operations where the light emission is maximized during photography of the last of the plurality of images which are to be continuously taken with accompanying stroboscopic light.

4. An image taking system as defined in claim 1 in which the stroboscopic light control unit suppresses, when there is a photographing where the estimated remaining energy in the charging unit is smaller than a predetermined value, the amount of the stroboscopic light emission in the photographings to be executed at least before the estimated remaining energy in the charging unit is smaller than a predetermined value.

5. An image taking system as defined in claim 1 further comprising an alarm unit which makes an alarm when there is a photographing where the estimated remaining energy in the charging unit is smaller than a predetermined value.

6. An image taking system as defined in claim 1 in which the stroboscopic light control unit is a unit for calculating the amount of light emission when the plurality of images are taken.

7. An image taking system as defined in claim 1 further comprising an information attaching unit for attaching continuous photographing information including information on the amount of light emission and the remaining energy in the charging unit to the image obtained through the photographing.

8. An image taking system as defined in claim 1 in which the stroboscopic light control unit is a unit for calculating the next time interval of light emission on the basis of the remaining energy.

9. An image taking system as defined in claim 8 in which the estimating unit and the stroboscopic light control unit are units for executing the estimation of the remaining energy and calculation of the next time interval of light emission at least at a time after the calculation of the light emission.

10. An image taking system as defined in claim 8 further comprising an information attaching unit for providing continuous photographing information including information on the amount of light emission, the remaining energy in the charging unit and the time interval of light emission to the image obtained through the photographing.

11. A method of controlling the image taking system comprising an image taking unit which photographs the object upon receipt of a photographing instruction and obtains an image representing the object,
a light emitting unit which emits stroboscopic light,
a charging unit which stores energy for emitting the stroboscopic light,
a photographing control unit which controls the image taking unit to execute a continuous photographing where a plurality of images are continuously taken including a plurality of images with accompanying stroboscopic light, and
a stroboscopic light control unit which controls the light emitting unit to emit the stroboscopic light when photographing the images with accompanying stroboscopic light, comprising the step of
estimating, when photographing the images with accompanying stroboscopic light, the remaining energy in the charging unit after the photographing, on the basis of each light emission and the remaining energy in the charging unit upon the light emission and
when the estimated remaining energy in the charging unit is smaller than a predetermined value, executing, by the charging unit, at least the photographing of the last of the plurality of images which are to be continuously taken with accompanying stroboscopic light.

12. A non-transitory computer-readable recording medium on which a program is stored for causing a computer to execute a method of controlling an image taking system comprising an image taking unit which photographs the object upon receipt of a photographing instruction and obtains an image representing the object,
a light emitting unit which emits stroboscopic light,
a charging unit which stores energy for emitting the stroboscopic light,
a photographing control unit which controls the image taking unit to execute a continuous photographing where a plurality of images are continuously taken including a plurality of images with accompanying stroboscopic light, and
a stroboscopic light control unit which controls the light emitting unit to emit the stroboscopic light when photographing the images with accompanying stroboscopic light, comprising the step of
estimating, when photographing the images with accompanying stroboscopic light, the remaining energy in the charging unit after the photographing, on the basis of each light emission and the remaining energy in the charging unit upon the light emission, and
when the estimated remaining energy in the charging unit is smaller than a predetermined value, executing, by the charging unit, at least the photographing of the last of the plurality of images which are to be continuously taken with accompanying stroboscopic light.

\* \* \* \* \*